(12) United States Patent
Wipiejewski

(10) Patent No.: US 7,410,306 B2
(45) Date of Patent: Aug. 12, 2008

(54) OPTO-ELECTRONIC DEVICE FOR OPTICAL FIBRE APPLICATIONS

(75) Inventor: Torsten Wipiejewski, Hksar (CN)

(73) Assignee: Hong Kong Applied Science and Technology Research Institute Co., Ltd., New Territories, Hong Kong Sar (CN)

( * ) Notice: Subject to any disclaimer, the term of this patent is extended or adjusted under 35 U.S.C. 154(b) by 0 days.

(21) Appl. No.: 11/246,131

(22) Filed: Oct. 11, 2005

(65) Prior Publication Data
US 2007/0140624 A1    Jun. 21, 2007

(51) Int. Cl.
    *G02B 6/36*    (2006.01)
(52) U.S. Cl. .............................. 385/88; 385/92; 385/94; 257/98; 257/100
(58) Field of Classification Search .............. 385/88–94; 257/98–100
    See application file for complete search history.

(56) References Cited

U.S. PATENT DOCUMENTS

| | | | |
|---|---|---|---|
| 4,539,476 A * | 9/1985 | Donuma et al. ........ 250/227.24 |
| 5,687,270 A * | 11/1997 | Takizawa ...................... 385/94 |
| 6,015,239 A * | 1/2000 | Moore .......................... 385/92 |
| 6,341,898 B1 * | 1/2002 | Matsushita ................... 385/88 |
| 6,354,747 B1 * | 3/2002 | Irie et al. ...................... 385/88 |
| 6,572,280 B2 * | 6/2003 | Hurt et al. ..................... 385/92 |
| 7,056,034 B2 * | 6/2006 | Togami et al. ................ 385/88 |
| 2004/0008952 A1 * | 1/2004 | Kragl ........................... 385/88 |
| 2005/0202826 A1 * | 9/2005 | Yuang ......................... 455/450 |

FOREIGN PATENT DOCUMENTS

JP    60017411 A  *  1/1985

* cited by examiner

*Primary Examiner*—Hemang Sanghavi
(74) *Attorney, Agent, or Firm*—Buchanan Ingersoll & Rooney PC

(57) ABSTRACT

An opto-electronic device comprising opto-electronic circuitry on a lead-frame and an optical guide receptacle for receiving an optical guide coupler, the opto-electronic circuitry comprises signal conversion means whereby an optical signal can be converted into an electrical signal or vice versa, the optical guide receptacle comprises means for guiding reception of an optical guide coupler whereby an optical guide coupler is optically aligned with the signal conversion means when received by said optical guide receptacle.

24 Claims, 4 Drawing Sheets

OPTO-ELECTRONIC DEVICE FOR OPTICAL FIBRE APPLICATIONS

FIELD OF THE INVENTION

This invention relates to opto-electronic devices and, more particularly, to opto-electronic devices for optical fibre applications. More specifically, although not exclusively, this invention relates to opto-electronic devices for coupling with an optical fibre termination.

BACKGROUND OF THE INVENTION

Optical fibres are widely used in many applications, for example, optical communication, remote sensing and monitoring. The core of an optical fibre is typically very small and fragile. Therefore, optical fibres are commonly provided with termination connectors for convenient coupling with an opto-electronic device. For example, an optical fibre is terminated with a glass-ferrule for enhanced mechanical stability. The ferrule also provides additional convenience so that an optical fibre core can be more easily aligned with a signal conversion means such as a photo-detector or an optical transmitter. To take advantage of the characteristic optical fibre termination, it will be beneficial to provide opto-electronic devices which are compatible with the optical fibre terminations for more efficient coupling and uncoupling.

OBJECT OF THE INVENTION

Hence, it is an object of this invention to provide opto-electronic devices for coupling with common optical fibre terminations so as to facilitate efficient coupling and uncoupling between an optical fibre and the opto-electronic devices. At a minimum, it is an object of this invention to provide a useful choice of a packaged opto-electronic devices.

SUMMARY OF THE INVENTION

Accordingly, this invention has described an opto-electronic device comprising opto-electronic circuitry on a lead-frame and an optical guide receptacle for receiving an optical guide coupler, the opto-electronic circuitry comprises signal conversion means whereby an optical signal can be converted into an electrical signal or vice versa, the optical guide receptacle comprises means for guiding reception of an optical guide coupler whereby an optical guide coupler is optically aligned with the signal conversion means when received by said optical guide receptacle. An opto-electronic device with an optical guide receptacle mounted on a lead-frame package provides efficient and expeditious coupling.

Another advantage of a lead-frame packaged opto-electronic device for coupling with a terminated optical fibre is the production efficiency since a plurality of devices can be formed on a single metal sheet before the plurality of devices are separated from the metal sheet.

Preferably, said optical guide receptacle comprises an axially extending aperture for guiding an optical guide coupler towards said signal conversion means for optically aligned coupling axially therewith.

Preferably, said axially extending aperture is formed on a cover lid, the cover lid and the optical guide receptacle are integrally moulded, the aperture on said cover lid is aligned with said signal conversion means.

Preferably, a focusing lens is formed on the cover lid and at an axial end of said axially extending aperture.

Preferably, a plastic housing is moulded on said lead-frame, the plastic housing forms a compartment which contains the opto-electronic circuitry, the compartment is sealed by said cover lid with said signal conversion means is optically communicable with said optical guide receptacle.

Preferably, the compartment of said plastic housing is filled with an optically transparent substance and the cover lid is fixed onto said plastic housing.

Preferably, said optical guide receptacle is adapted for receiving a packaged optical guide coupler which comprises an optical fibre with a ferrule, the optical guide receptacle comprise an axially extending aperture the axis of which is optically aligned with said signal conversion means, the packaged optical guide coupler and the axially extending aperture of said optical guide receptacle is adapted so that the optical fibre is aligned with said signal conversion means when received by said optical guide receptacle.

Preferably, the axis of said optical guide receptacle is orthogonal to a mounting plane of the lead-frame.

Preferably, said optical guide receptacle comprises a tubular guide for guiding a packaged optical guide coupler axially towards said signal conversion means.

Preferably, said lead-frame and said opto-electronic circuitry are contained in a moulded plastic housing, said moulded plastic housing comprises a window which exposes said signal conversion means, said optical guide receptacle comprises an axially extending aperture, the axially extending aperture meets the plastic housing at said window.

Preferably, said axially extending aperture protrudes orthogonally from said moulded plastic housing and axially away from said signal conversion means.

Preferably, said axially extending aperture has a circular cross-section.

Preferably, said optical guide receptacle comprises axially extending alignment means which are circumferentially distributed around said axially extending aperture.

Preferably, each said alignment means comprises an axially extending fin.

Preferably, said signal conversion means comprises a laser source.

Preferably, said laser source is a vertical-cavity surface emitting laser.

Preferably, said signal conversion means comprises a photo-detector.

Preferably, said opto-electronic circuitry comprises an optical receiver, an optical transmitter or an optical transceiver.

Preferably, contact leads of said lead-frame are transversal to the axially extending aperture.

Preferably, said opto-electronic circuitry comprises a laser transmitted and a monitoring photo-detector for feedback control of the laser transmitter, laser output is transmitted through said optical guide receptacle.

Preferably, the opto-electronic circuitry comprises an optical receiver, said signal conversion means comprises a photo-diode.

Preferably, a partial reflector is disposed intermediate the optical guide receptacle and the signal conversion means whereby light travelling between the optical guide receptacle and the signal conversion means is partially reflected to a signal monitoring means for circuitry control.

Preferably, the partially reflected light is for feedback control of operating conditions of the signal conversion means.

BRIEF DESCRIPTION OF THE DRAWINGS

Preferred embodiments of the present invention will be explained in further detail below by way of examples and with reference to the accompanying drawings, in which.

DETAILED DESCRIPTION OF THE PREFERRED EMBODIMENTS

Figure 1:
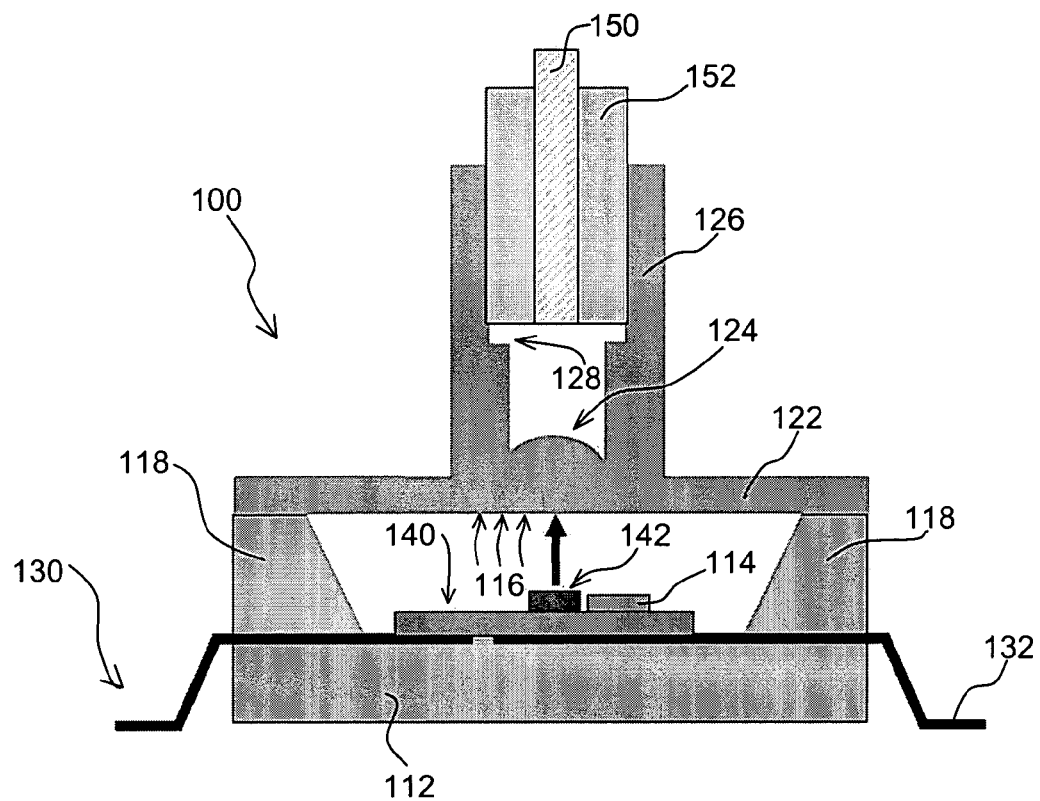
FIG. 1 shows a schematic cross-sectional view of a first preferred embodiment of an opto-electronic device of this invention.
Figure 2:
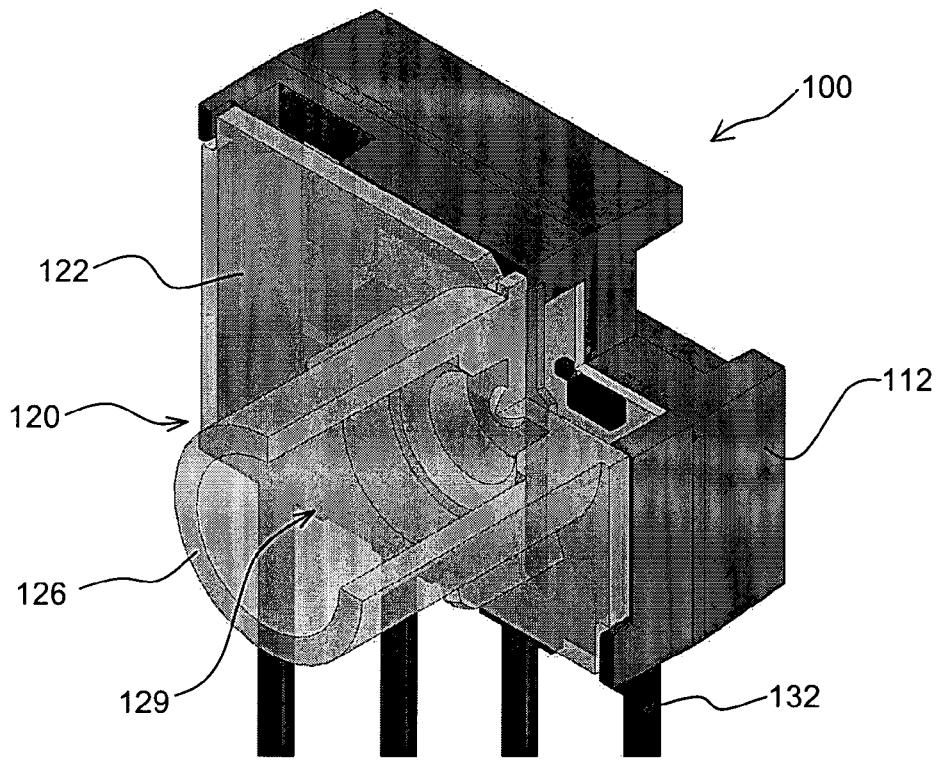
FIG. 2 shows a partially removed schematic perspective view of a second preferred embodiment of an opto-electronic device of this invention.
Figure 3:
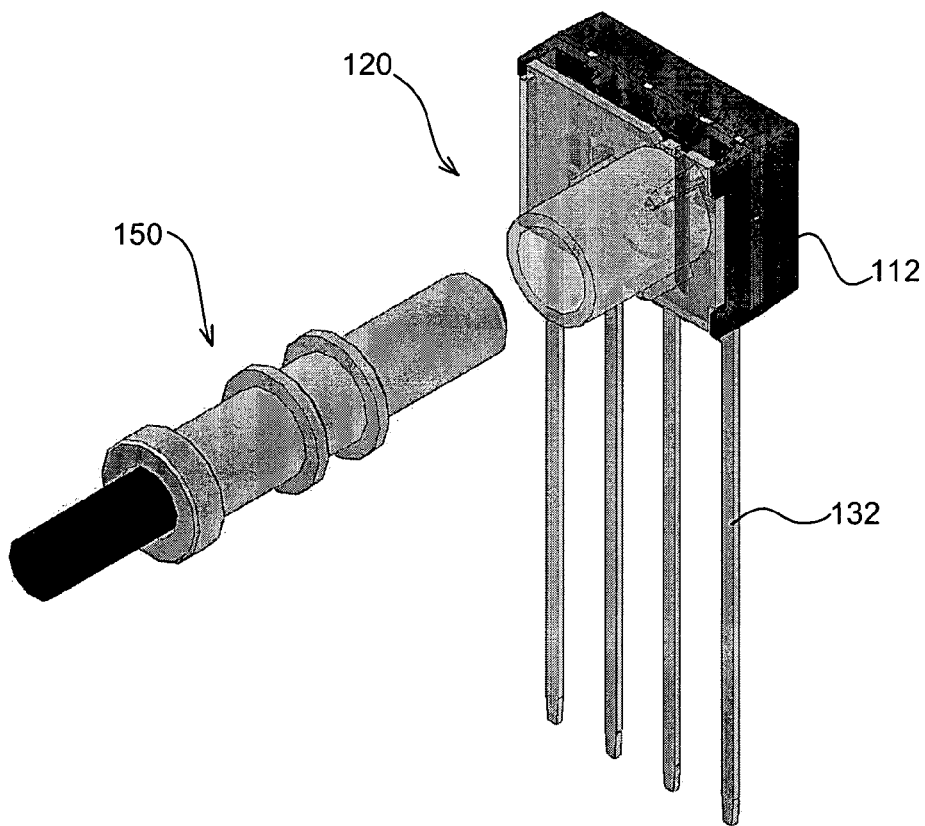
FIG. 3 illustrates an opto-electronic device of FIG. 2 aligned with an optical fibre termination.

Referring firstly to FIGS. 1 to 3, an opto-electronic device 100 comprises a housing 110, a lead-frame 130 and opto-electronic circuitry 140 is shown. The opto-electronic circuitry 140 comprises an opto-electronic signal conversion device such as, for example, an optical transmitter with a laser or an LED source, an optical receiver with a photo-detector, or an optical transceiver where appropriate. Preferably, the opto-electronic circuitry 140 comprises an integrated circuit (IC) chip. The opto-electronic circuitry 140 is mounted and connected to a conductive lead-frame for external connection. The housing 110 comprises a lower housing 112 and an upper housing 120. The lower housing 112 is made of plastics and is moulded with the lead-frame at between the lateral ends of the legs 132 of the lead-frame 130. The plastic lower housing 112 is moulded so that compartment 114 with a top aperture 116 surrounded by peripheral walls 118 is formed. The opto-electronic circuitry 140 is placed in this hollow compartment 114 and is supported by a platform of the lead-frame which is in turn supported by the lower plastic housing 112. The opto-electronic circuitry 140 is fixed in place by transparent fastening substances such as resin or other appropriate optically transparent medium. This transparent fastening medium also contributes to the fastening of the upper housing 120 to the lower housing 112 where appropriate.

The upper housing 120 is also made of plastics and comprises a cover lid 122, a focusing lens 124 and an optical guide receptacle 126. The optical guide receptacle 126 comprises an axial barrel defining an axially extending aperture for guiding an optical guide coupler axially towards the signal conversion means 142 (which is a photo-detector in case of an optical receiver or a laser or LED source in case of an optical transmitter) for optical alignment therewith. A stop 128 is disposed intermediate the top free end of the optical guide receptacle 126 and the focusing lens 124 which is disposed at the junction of the optical guide receptacle 126 and the cover lid 122. The stop 128 provides adequate clearance between the head of an optical guide 150 and the focusing lens 124.

The internal bore 129 of the optical guide receptacle is adapted so that when an optical guide is duly received by the optical guide receptacle, the optical fibre 150 will be aligned with the signal conversion means 142 for optical communication.

In the arrangement of FIGS. 1 and 2, the axis of the optical receptacle and the core of the optical fibre are coaxial, with their common axis aligned to the signal conversion means 142. The upper housing 122 is attached to the lower housing 112 by, for example, ultra-sonic welding or glue fastening. To facilitate speedy assembly between the lower and upper housings, location means, such as slot and lug pairs may be correspondingly distributed on the corresponding periphery of the upper and lower housings. In order to ensure optimal alignment between the optical fibre module 152 and the opto-electronic signal conversion means 142, the upper and lower housing may be fastened with a referencing or testing optical fibre module 152 received and operating within the optical guide receptacle so that the upper and lower housings are fastened together when an optimal signal output is detected. The focusing lens 124 is convex towards the optical fibre 150. Of course, the focusing lens can be other appropriate lens such as a concave lens where appropriate.

The opto-electronic circuitry is mounted on a conductive platform of the lead-frame 130. The plane of the conductive platform is substantially parallel to a plane defined by the flat portions of the free ends of the legs of the lead-frame. This plane of the platform is substantially orthogonal to the axis of the internal bore of the optical receptacle.

Figure 4:
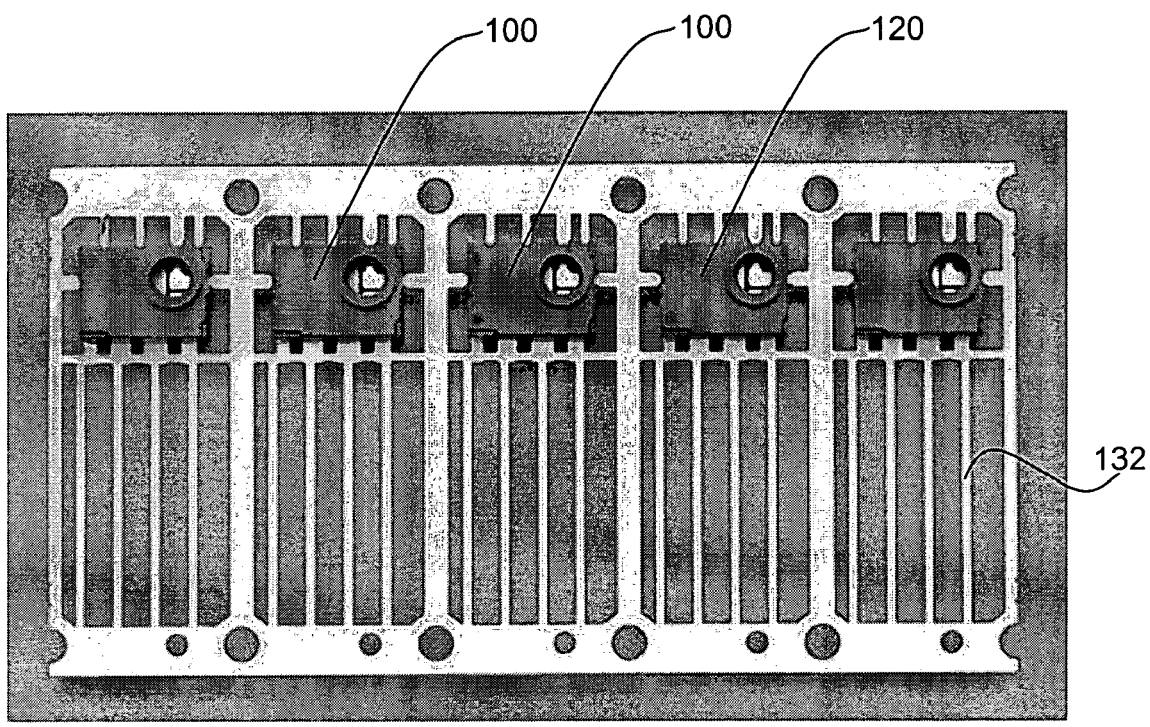
FIG. 4 shows a plurality of opto-electronic devices of the second preferred embodiment on a common lead-frame package.
Figure 4A:
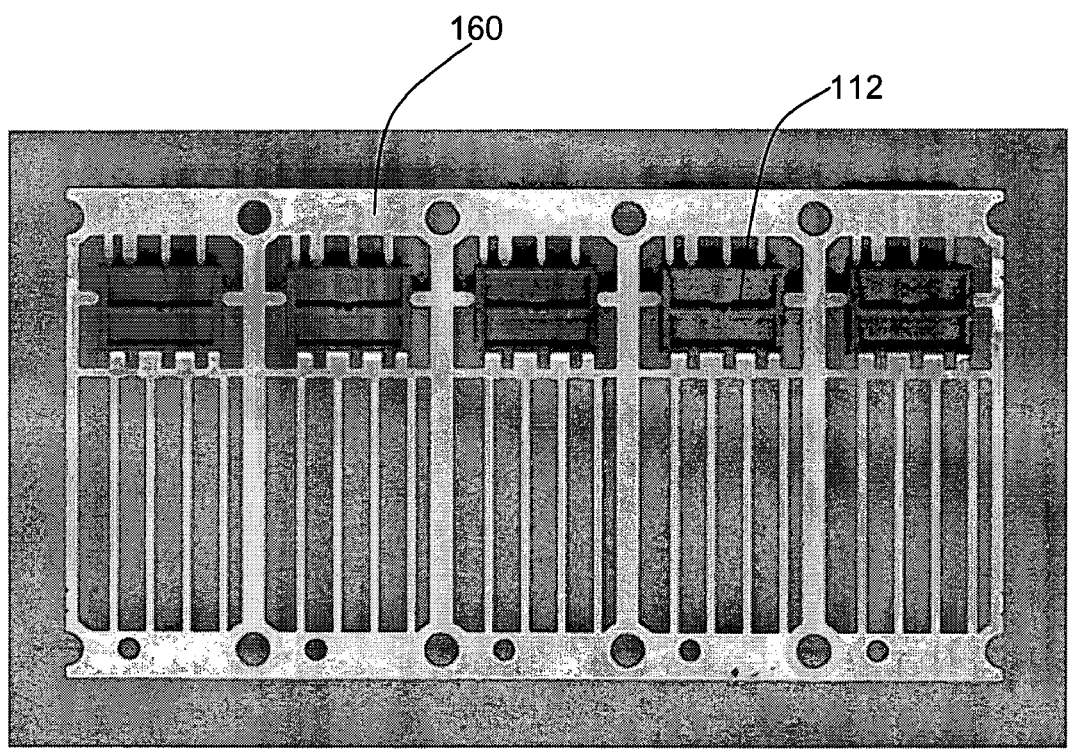
FIG. 4A shows the bottom view of the device of FIG. 3.

Referring to FIGS. 4 and 4A, a plurality of opto-electronic devices 100 are formed on a stamped metallic sheet 160 which comprises a plurality of lead-frames. Such lead-frame comprises a rigid legs and platform for mounting the opto-electronic circuitry. Hence, a plurality of lead-frame can be formed at the same time on a single metal sheet prior to the formation of separate lead-frame packaged devices and this substantially enhances production efficiency.

Figure 5:
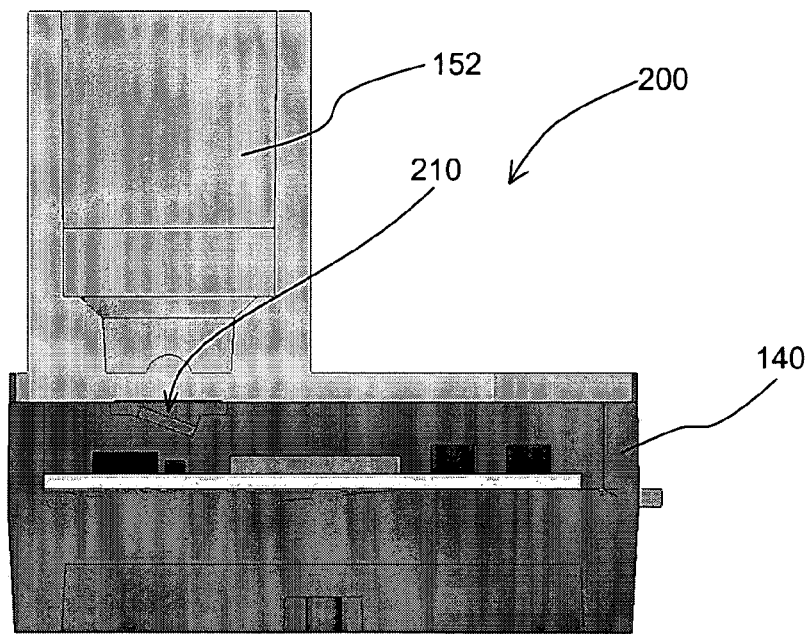
FIG. 5 shows schematically a third preferred embodiment of this invention.

In a second preferred embodiment as shown in FIG. 5, the opto-electronic device comprises an optical transmitter with a vertical-cavity surface-emitter laser (VCSEL). The VCSEL drive current and output power is controlled by an electronic driver chip plus passive components inside the package formed by the upper and lower housing. The output power of the VCSEL can be controlled by closed-loop monitoring wherein output light of the VCSEL is partially reflected by a reflector 210 mounted intermediate the focusing lens and the laser source 142. The reflected light from the reflector 210 hits a monitor photo-diode mounted side-by-side to the laser source. The photo-current detected at the monitor photo-detector is a measure of the total laser output power which is fed back to the control circuitry for adjusting drive current and therefore stabilizing output power of the laser source. The additional components can be placed on an additional sub-mount inside the packaged device 200. The lead-frame package is typically a through-hole mountable design or a surface mount design as shown more particularly in FIGS. 1-3. After the components have been mounted inside the device compartment, the cover lid of the upper housing can be attached to the lower housing by glue. The cover lid can be aligned with the components inside the lower housing by active or passive alignment. In the active alignment mould, the upper and lower housing will be aligned when the VCSEL is emitting light and the light emission detected by a test optical fibre inserted in the barrel of the optical guide receptacle. In the passive alignment mould, the cover lid 122 of the upper housing is fastened to the periphery of the lower housing using appropriate mechanical location means.

The focusing means 124 is adapted for maximal coupling efficiency and/or wide alignment tolerances. The focusing lens 124 can be integrally formed with the upper housing or a detachable housing. The configuration comprising a lead-frame mounted with a housing with a pre-aligned optical barrel permits a wide mechanical alignment tolerances. This is particularly important because optical fibre termination modules often require a wide lateral alignment tolerance due to fabrication tolerances in fibre ferrule. A wide longitudinal alignment tolerance is preferred so as to facilitate elastic coupling between a fibre ferrule and an optical module. This characteristic is particularly useful in connection with an optical connector since a fibre ferrule can be very short to form a fibre stub type of device.

Figures 6, 7:
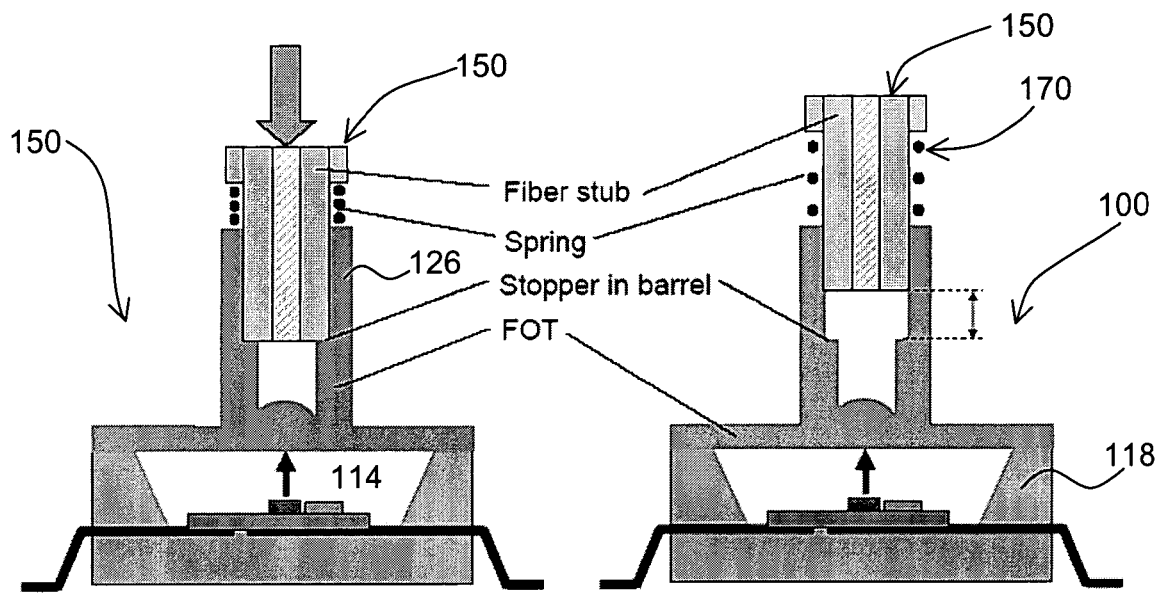
FIG. 6 illustrates an exemplary application of an opto-electronic device of FIG. 1 when coupled with a terminated optical fibre.
FIG. 7 illustrates the termination of the optical fibre of FIG. 6 in a second configuration.

FIGS. 6 and 7 shows an exemplary application of the opto-electronic device 100 in which the fibre stub and the opto-electronic device are mechanically connected by a spring-type connector device. The distance of the ferrule and-facite to the lid alignment plane will vary depending on the resilience of the spring 170. A wide longitudinal alignment tolerance of more than 0.5 mm can be obtained with such an arrangement. For example, in FIG. 6, the fibre stub is pushed by external force towards the stub inside the optical barrel. The compressive force can be due to connection with another fibre. In FIG. 7, there is no externally applied force on the fibre stub and the spring 170 is relaxed, whereby pushing the fibre stub away from the stub and the focusing lens. However, coupling of the signal conversion means with the fibre should remain as constant as possible over the entire longitudinal coupling range.

Figure 8:
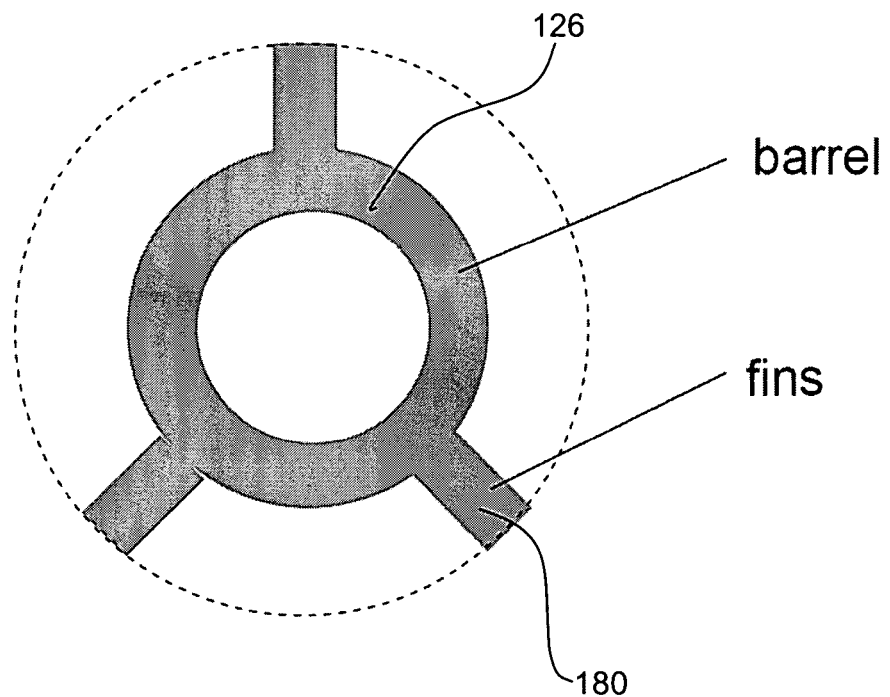
FIG. 8 illustrates an opto-electronic device of this invention with a plurality of guiding fins.

To further enhance speedy and accurate alignment between a fibre stub and the opto-electronic device, a plurality of radially extending fins may be formed on the formed on the exterior of the barrel 126 (as shown in FIG. 8) so as to guide insertion of an optical fibre stub into coupling with the signal-conversion means 124 of the device 100.

In this specification, parts which are common to the various embodiments or examples use the same numerals where appropriate for succinctness.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to a laser source, it should be appreciated that the invention can apply, whether with or without modification, to other opto-electronic devices without loss of generality.

The invention claimed is:

1. An opto-electronic device comprising:
    opto-electronic circuitry on a lead-frame, said opto-electronic circuitry comprising signal conversion means for conversion of an optical signal into an electrical signal or vice versa; and
    a housing comprising a first housing portion which is molded onto said lead-frame and a second housing portion which defines an optical guide receptacle having an axially extending aperture for guiding reception of an optical guide coupler towards the signal conversion means for optically aligned coupling axially therewith, said axially extending aperture being formed on a cover lid which forms part of said second housing portion, said cover lid and said optical guide receptacle being integrally molded, and
    said axially extending aperture on said cover lid is aligned with said siginal conversion means,
    wherein said first and second housing portions collectively define a hollow compartment within which said opto-electronic circuitry is situated and through which said optical guide coupler is optically communicable with said signal conversion means, and said optical guide receptacle is arranged such that said optical guide coupler is optically aligned with said signal conversion means when received by said optical guide receptacle, and
    wherein said hollow compartment is filled with a transparent resin.

2. An opto-electronic device according to claim 1, wherein a focusing lens is formed on the cover lid and at an axial end of said axially extending aperture.

3. An opto-electronic device according to claim 1, wherein the hollow compartment is sealed by said cover lid, with said signal conversion means being optically communicable with said optical guide receptacle through said axially extending aperture.

4. An opto-electronic device according to claim 3, wherein said hollow compartment of said housing is filled with an optically transparent resin, and the cover lid fastened onto said plastic housing by said resin.

5. An opto-electronic device according to claim 1, wherein said optical guide receptacle is adapted for receiving a packaged optical guide coupler which comprises an optical fibre with a ferule, the axis of the axially extending aperture of the optical guide receptacle is optically aligned with said signal conversion means.

6. An opto-electronic device according to claim 5, wherein the axis of said optical guide receptacle is orthogonal to a mounting plane of said lead-frame.

7. An opto-electronic device according to claim 5, wherein said optical guide receptacle comprises a tubular guide for guiding said packaged optical guide coupler axially towards said signal conversion means.

8. An opto-electronic device according to claim 1, wherein said lead-frame and said opto-electronic circuitry are contained within said housing which is a moulded plastic housing, said moulded plastic housing defining a window through which said signal conversion means is exposed; and said optical guide receptacle comprises an axially extending aperture; and wherein the axially extending aperture meets the plastic housing at said window.

9. An opto-electronic device according to claim 8 wherein said axially extending aperture protrudes orthogonally from said moulded plastic housing and axially away from said signal conversion means.

10. An opto-electronic device according to claim 9 wherein said axially extending aperture has a circular cross-section.

11. An opto-electronic device according to claim 10 wherein said optical guide receptacle comprises axially extending alignment means which are circumferentially distributed around said axially extending aperture.

12. An opto-electronic device according to claim 11, wherein each said alignment means comprises an axially extending fin.

13. An opto-electronic device according to claim 1, wherein said signal conversion means comprises a laser source.

14. An opto-electronic device according to claim 13, wherein said laser source is a vertical-cavity surface emitting laser.

15. An opto-electronic device according to claim 1, wherein said signal conversion means comprises a photo-detector.

16. An opto-electronic device according to claim 1, wherein said opto-electronic circuitry comprises an optical receiver, an optical transmitter or an optical transceiver.

17. An opto-electronic device according to claim 1, wherein contact leads of said lead-frame are transverse to the axially extending aperture.

18. An opto-electronic device according to claim 1, wherein said opto-electronic circuitry comprises a laser transmitter and a monitoring photo-detector for feedback control of the laser transmitter, and wherein laser output is transmitted through said optical guide receptacle.

19. An opto-electronic device according to claim 1, wherein the opto-electronic circuitry comprises an optical receiver, said signal conversion means comprises a photo-diode.

20. An opto-electronic device according to claim 1, wherein a partial reflector is disposed intermediate the optical guide receptacle and the signal conversion means whereby light travelling between the optical guide receptacle and the signal conversion means is partially reflected to a signal monitoring means for circuitry control.

21. An opto-electronic device according to claim 20, wherein the partially reflected light is for feedback control of operating conditions of the signal conversion means.

22. An assembly of a plurality of opto-electronic devices according to claim 1 on a common lead-frame.

23. An opto-electronic device according to claim 1, wherein said transparent resin is a fastening substance contributing to fastening between said first and second housing portions.

24. An opto-electronic device according to claim 23, wherein said opto-electronic circuitry is held in place by said transparent fastening substance.

* * * * *